March 14, 1967 A. H. YOUMANS ET AL 3,309,522
PULSED NEUTRON GENERATOR
Original Filed Feb. 18, 1963 3 Sheets-Sheet 1

INVENTORS
ARTHUR H. YOUMANS
ERIC C. HOPKINSON
BY
E. F. Bard
ATTORNEY

March 14, 1967 A. H. YOUMANS ET AL 3,309,522
PULSED NEUTRON GENERATOR
Original Filed Feb. 18, 1963 3 Sheets-Sheet 3

INVENTORS
ARTHUR H. YOUMANS
ERIC C. HOPKINSON
BY
E. F. Bard
ATTORNEY

United States Patent Office 3,309,522
Patented Mar. 14, 1967

3,309,522
PULSED NEUTRON GENERATOR
Arthur H. Youmans and Eric C. Hopkinson, Houston Tex,. assignors to Dresser Industries, Inc., Dallas Tex., a corporation of Delaware
Continuation of application Ser. No. 259,073, Feb. 18, 1963. This application May 13, 1965, Ser. No. 456,902
26 Claims. (Cl. 250—84.5)

This is a continuation of the copending application Ser. No. 259,073, filed Feb. 18, 1963, by Arthur H. Youmans and Eric C. Hopkinson, and now abandoned.

This invention relates to methods and apparatus for causing ion beam accelerator tubes to generate pulses of neutrons at a very high frequency, and is particularly directly to methods and apparatus of such character which are capable of being used in the logging of boreholes in the earth.

Various methods and apparatus employing sources of radiation for the investigation of subsurface earth formations are now well known. Generally, most of the radioactive well logging apparatus now in use includes either a source of gamma rays, such as an encapsulated quantity of cesium-137, or a source of neutrons such as an encapsulated mixture of radium and beryllium. Although these capsules of radioactive material are still in common use for well logging purposes, so-called "artificial" sources of radiation are becoming increasingly popular because they may be "turned off" when not in use, and because they provide relatively monoenergetic radiation of a particular character. Typical of these artificial sources is the static atmosphere ion accelerator tube described in U.S. Patent No. 2,689,918, which issued Sept. 21, 1954, to A. H. Youmans, and which is designed to provide a substantial output of high energy neutrons by means of the now well-known "D-T reaction." Accelerator tubes of this type may be powered by a belt-driven, electrostatic generator, such as the well known Van de Graaff high voltage generator.

Generally, most accelerator tubes used in well logging instruments comprise a steel jacket adapted to house a sealed or "static" atmosphere composed of one or both of the heavy isotopes of hydrogen at a very low pressure. This atmosphere may be considered functionally as divided into an ionization region and an accelerating region. Thus the accelerator tube includes structure for ionizing the atmosphere within the so-called "ionization region." These ions are then accelerated at high speeds, by other tube structure, into a target which also contains one or both of the heavy hydrogen isotopes, and the resulting reactions produce neutrons. If both the atmosphere and the target contain only deuterium, then neutrons having energies of approximately 2.2 mev. will be produced by virtue of the well known "D-D" reaction. Alternately, if the target is impregnated with tritium as described in the aforementioned Youmans Patent No. 2,689,918, the neutrons having energies of approximately 14.4 mev. will be produced as a result of the well known "D-T" reaction.

Several techniques are presently used in logging operations employing an artificial source of neutrons. For example, the formations may be bombarded with neutrons and a measurement may be made of the number and energy of gamma rays arising from either inelastic scattering, or capture, of the bombarding neutrons by the nuclei of the formation materials. Alternately, high energy neutron bombardment may excite the formation nuclei so as to cause these excited nuclei to emit decay gamma radiation, and a measurement of the energy and decay rate of such radiation will indicate the identity of the excited nuclei. Then again, measurements of the distribution of the neutron flux are often made with respect to time or space.

It may be readily seen that, when the formations surrounding a borehole are irradiated by neutrons from an accelerator, gamma radiation will be produced in the formations simultaneously as a result of all of the foregoing nuclear reactions. However, if the accelerator is caused to emit neutrons in discrete bursts, or pulses, then one or more classes of gamma radiation may be distinguished and identified. In particular, if the earth formations are irradiated with neutrons during repetitive, relatively short intervals of time whereby successive operating cycles are defined, then each such cycle will consist of an irradiation interval followed by a quiescent interval. Each such quiescent interval may be comprised of a first period wherein neutrons from the accelerator may be slowed, diffused, and ultimately be captured by nuclei of the formation substances so irradiated, and a second period wherein radioactive elements formed by neutron interactions may exhibit a product of radioactive decay. The average lifetime of a neutron in a vacuum is about 13 minutes, but in ordinary materials the lifetime of neutrons is much shorter. In common earth materials, the average lifetime of neutrons ranges between extremes of 100 microseconds (more or less) for salt water, to perhaps 4000 microseconds or more in quartzite. Thus, in order for the operating cycle of a pulsed accelerator source to be useful and meaningful, it is essential that the irradiation time interval be very short if the exponential decay of the neutron flux is to be measured, or if the so-called "prompt" gamma radiation is to be distinguished from decay gamma radiation emitted by activated nuclei. In particular, such irradiation intervals should preferably be of the order of 5 to 50 microseconds in duration, since fast neutrons (1 mev. or greater) are generally slowed to thermal energy in 10 to 100 microseconds, depending upon environment. For example, hydrogenous materials will exercise greater slowing effect on fast neutrons than will other substances, and neutrons in and near a liquid-filled borehole will be slowed to thermal energy before those neutrons which have penetrated the formations.

The operation of a neutron source composed of an accelerator tube and a belt-driven electrostatic generator is never a simple matter, even when such a source is located in an ideal environment. Many system parameters must be properly selected and maintained in proper balance, as will hereinafter be made apparent, before a steady neutron output can be satisfactorily attained, and if the generator is cyclically actuated, these parameters tend to quickly fall into imbalance. Moreover, since the stability of this type of neutron source is particularly affected by changes in environment, and since well logging equipment is subjected to great changes in environment, attention has heretofore been almost exclusively directed to stabilizing the neutron output, rather than towards producing a pulsed output by deliberately cycling the source. Such cycling of the source, which has heretofore been achieved without unduly affecting the stability of the system, has been generally limited to pulses of greater than 0.1 second in duration, and at a pulse frequency of about 5 per second.

These disadvantages of the prior art are overcome with the present invention, and novel methods and apparatus are provided herein which obtain pulses of neutrons as short as 5 microseconds in duration at a pulse frequency at least as great as 10,000 pulses per second. Moreover, with the present invention, system stability is not adversely affected, power is conserved rather than wasted, and both the duration of each pulse and the magnitude of the quiescent interval are effectively controlled.

The advantages of the present invention are preferably attained, in a neutron source composed of an ion beam accelerator tube and a Van de Graaff electrostatic generator, by maintaining all other system functions at a stable condition of operation while pulsing only the flow of ionizing electrons in the ionization region of the accelerator tube. Particular methods and apparatus for interrupting the ionization current (as it is generally called), without adversely affecting the balance of the system, will hereinafter be described in detail.

Accordingly, it is an object of the present invention to provide novel methods and apparatus for obtaining pulses of neutrons at a very high preselected frequency and having a very short duration.

It is also an object of the present invention to provide novel methods and apparatus for pulsing an artificial source of neutrons disposed in subsurface well logging apparatus, at a very high preselected frequency and having a very short duration.

A specific object of the present invention is to provide novel methods for pulsing the ionization supply of an ion beam accelerator tube connected to an electrostatic generator, in a manner such that said accelerator tube is caused to emit discrete pulses of neutrons at a very high preselected pulse frequency and of a very short duration.

Another specific object of the present invention is to provide novel apparatus for pulsing the ionization supply of an ion beam acelerator tube connected to an electrostatic generator, in a manner such that the accelerator tube is caused to emit discrete pulses of neutrons at a very high preselected pulse frequency and of a very short duration.

These and other objects of the present invention will be apparent from the following detailed description wherein reference is made to the figures of the accompanying drawings.

Figure 1:
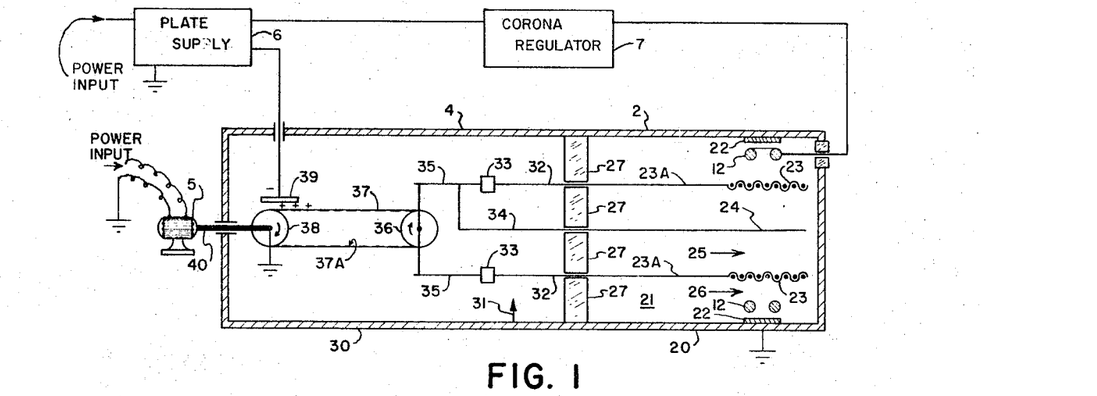
FIGURE 1 is a schematic diagram of a typical ion beam accelerator tube and electrostatic generator arranged to produce neutrons.

In those forms of the present invention chosen for purposes of illustration in the drawings, FIG. 1 shows an artificial neutron source composed of an accelerator tube 2, such as the static atmosphere ion accelerator depicted in the aforementioned Youmans Patent No. 2,689,918, and a belt-driven electrostatic generator 4, such as a Van de Graaff high voltage generator. As depicted, the accelerator tube includes a gas-tight jacket 20 which is adapted to house an atmosphere 21 composed of either deuterium or tritium (or a mixture of both), at a very low pressure. Disposed generally at the axial center of the accelerator tube 2 is an ionization supply composed of an anode 24 and a cathode 23. The anode 24 is preferably formed of a single wire or relatively thin rod-like electrode, and the cathode 23 is preferably formed of a circular body of fine wire mesh or screen disposed circumferentially about the wire anode 24. The cathode 23 is preferably mounted on or supported by a metal tube-like column 23A. Included within the accelerator tube 2, there may be found a belt-shaped target 22 which is generally formed of a thin strip of titanium mounted on the inner surface of the jacket 20 in a manner to surround or encircle the cathode 23 and anode 24. The target is necessarily impregnated with either deuterium or tritium, or a mixture of both, as will hereinafter be explained. Between the target 22 and the cathode 23 may also be found one or more electrodes, which are generally referred to as suppressor rings 12, for suppressing secondary electron emission from the target 22 as will also be hereinafter explained.

The electrostatic generator 4 is preferably composed of a cylindrical tank 30, which is electrically connected to the jacket 20 of the accelerator tube 2 by way of ground or "common," and which is preferably adapted to house a so-called "lower" pulley 38 and an "upper" pulley 36. These two pulleys are arranged to support and to drive a continuous belt 37 formed of non-conductive material such as leather or cloth, and containing or bearing small, regularly sized and spaced segments 37A of an electrically conductive substance as shown in FIG. 1. The lower pulley 38 is connected, for rotation purposes, to a driving mechanism of drive-shaft 40 of an electric motor 5. The upper pulley 36 may be supported by a two-section electrode assembly hereinafter referred to as the lower hollow electrode 35 and the upper hollow electrode 32. These two hollow electrodes are electrically separated from each other by an insulator 33, and from the tank 30 and the jacket 20 by the insulating socket 27 which connects the electrostatic generator 4 and the accelerating tube 2. As shown in FIG. 1, the lower hollow electrode 35 is electrically connected by means of conductor 34 to the anode 24 in the accelerating tube 2, and the upper hollow electrode 32 is electrically connected to the cathode 23 by means of the aforementioned column 23A. Also shown in FIG. 1 is an induction plate supply 6, which is connected to an induction plate 39 located adjacent the lower pulley 38.

Fundamentally, neutrons are produced by means of one or more of several possible nuclear reactions within the accelerator tube 2, depending upon the constituency of the atmosphere 21 and the content of the titanium target 22. For example, if the atmosphere 21 is composed of pure deuterium, and if the target 22 contains only deuterium, then if the atmospheric deuterium is ionized as hereinafter explained, and if these deuterium ions are accelerated into the deuterium-impregnated target 22, then the resulting "D-D reaction" will produce neutrons of approximately 2.2 mev. energy. However, if the target is impregnated with substantially only tritium, and if the atmosphere 21 contains only deuterium, then the well-known "D-T reaction" will occur to produce 14.4 mev. neutrons. Since the D-T reaction is capable of producing a much greater number of neutrons, and since 14.4 neutrons are much more desirable for well logging purposes, it is the D-T reaction which is generally employed for well logging purposes. Of course, the atmosphere 21 may be constituted of tritium, and the target 22 may be impregnated with deuterium. In such a case, the tritium ions will be accelerated into the target deuterium to also produce 14.4 mev. neutrons by means of the "D-T reaction." However, the heavier tritium atoms require much more energy to be accelerated into the target 22, and therefore this arrangement is seldom employed in well logging equipment since power is always at a premium where it must be transmitted thousands of feet "downhole" to the Van de Graaff generator. One exception to this is the fact that accelerator tubes are sometimes used which employ relatively equal mixtures of deuterium and tritium in both the atmosphere 21 and the target 22.

In operation, the induction plate supply 6 functions to apply a high negative voltage to the induction plate 39 which, in turn, induces a corresponding high positive charge on the lower pulley 38. The motor 5 operates to turn the lower pulley 38 in a manner so that the conductive segments 37A on the belt 37 carry the positive charge from the lower pulley 38 to the upper pulley 36. From the upper pulley 36, this positive charge flows through the lower hollow electrode 35, and the conductor 34, to the anode 24. Thus, as the Van de Graaff generator 4 continues to operate, the magnitude of this positive charge on the anode 24 increases with respect to both the cathode 23 and the target 22 until electrons begin to flow from the cathode 23 to the anode 24. This electron flow across the "ionization gap" 25 serves to ionize the deuterium (or tritium) in this region of the atmosphere 21, and thus these positively charged ions are correspondingly attracted towards the cathode 23. However, since the cathode 23 is formed in the manner of a mesh, most of the ions pass through the cathode 23 and are accelerated at very high speeds across the accelerating gap 26, and past the suppressor rings 12, into the target 22. As hereinbefore explained, it is this acceleration of the hydrogen isotope ions, into the isotope nuclei in the target 22, which produces the neutrons.

It may be seen that a voltage from the induction plate supply 6 is also connected through a suitable corona regulator 7 to apply a negative charge on the suppressor rings 12. Since secondary electrons will be emitted by the target 22 during its bombardment by the atmospheric ions, it is desirable to suppress this so-called "secondary electron emission" to prevent waste of power in the system. However, it is often dsirable to control the output of the induction plate supply 39 to stabilize the neutron output of the accelerator tube 2. Thus, the corona regulator 7 acts to apply a constant voltage to the suppressor rings 12, irrespective of variations in the output of the induction plate supply 6.

In addition to the so-called "beam current" (ion flow) across the accelerating gap 26, the electrostatic generator 4 is preferably adapted to develop a corona current flow between the upper hollow electrode 32 and generator tank 30. Since the upper hollow electrode 32 is not only electrically isolated from the lower hollow electrode 35, but also from "ground," the potential on the upper hollow electrode 32 rises with respect to "ground," as the ionization current between the anode 24 and the cathode 23 ionizes the atmosphere 21, until a current flow develops somewhere between the upper hollow electrode 32 and either the jacket 20 or the tank 30. Thus, in order to stabilize the beam current, a corona point 31 (which is a sharp pointed electrode) is preferably fixed to the inside surface of the tank 30 opposite the upper hollow electrode 32. Since the space between the tip of the corona point 31 and the nearest surface of the upper hollow electrode 32 is narrower than the space between the upper hollow electrode 32 and any other grounded part of the electrostatic generator 4, all leakage flow between the upper hollow electrode 32 and ground (except for the beam current) will be concentrated between the corona point 31 and the nearest surface of the upper hollow electrode 32. As is well known, it is an inherent characteristic of a corona discharge that the magnitude of the current flow is negligible until the voltage is brought to a certain magnitude $V_c$. However, as the voltage rises above $V_c$, the current flow becomes increasingly large and therefore, if the voltage established in the system between the upper hollow electrode 32 and the corona point 31 is substantially greater than $V_c$, relatively large fluctuations in corona current flow will produce only relatively small fluctuations in the voltage between the corona point 31 and the upper hollow electrode 32. The corona voltage at this point in the system is always equal to the voltage across accelerating gap 26, since the corona point 31 and the target 22 are both substantially at ground potential, the voltage across the accelerating gap 26 will become relatively stabilized by the corona discharge notwithstanding substantial fluctuations in other parameters of the system.

Figure 2:
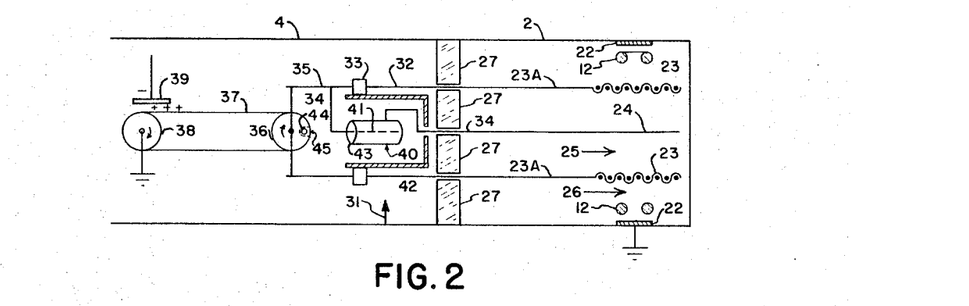
FIGURE 2 is a simplified representation of the accelerator tube and electrostatic generator shown in FIGURE 1, and adapted to incorporate a radiation responsive means for triggering the accelerator tube.

Referring now to FIGURE 2 wherein is shown a simpler representation of the neutron source depicted in FIGURE 1, there may be seen a preferred form of the present invention wherein a small self-quenching Geiger-Muller counter 40 has been interconnected along conductor 34. As shown, the central electrode 41 of the Geiger-Muller counter tube 40 is connected to the lower hollow electrode 35, and the jacket 43 of the tube 40 is electrically connected to the anode 24 in the accelerating tube 2. During operation of the system, positive charge is carried by the belt 37 to the upper pulley 36, and thence as hereinbefore described to the lower hollow electrode 35. However, no current will flow to the anode 24 due to the interposition of the counter tube 40. Nevertheless, as the belt 37 carries an increasing magnitude of charge to the central electrode 41 of the tube 40, potentials are developed within the system across the various interelectrode capacitances such as between the central electrode 41 and the jacket 43 of the counter tube 40, between the anode 24 and the upper hollow electrode 32, between the two hollow electrodes 32 and 35, between the column 23A and the anode 24, and between the cathode 23 and the suppressor rings 12 and the target 22. If the counter 40 is arranged in the system so as to be subject to incident radiation, then each time incident radiation "triggers" a "discharge" or pulse within the tube, current will flow from the central electrode 41 to the jacket 43 of the chamber 40, and thence to the anode 24, and each such discrete current flow will produce a resulting discrete flow or "pulse" of ionization current. Correspondingly, each pulse of ionization current will produce a discrete flow of beam current which, in turn, will produce a correspondingly discrete flow, or pulse, of neutrons. It is apparent that the neutron pulses produced in this manner will arise only when the counter tube 40 is struck and triggered by incident radiation. Such radiation may be from a source of alpha, beta or gamma radiation placed near the counter; or it may be beta radiation from the target or X-rays produced within the neutron source. Or it may be composed of alpha particles produced in correlation with the neutrons, or gamma rays produced in the tube 2 structure by capture or inelastic scattering therein of the neutrons. Thus, the neutron pulses produced in this manner will occur at a random rate and in a relatively uncontrolled manner, although this may be quite unobjectionable for many applications of the present invention.

Referring again to FIGURE 2, there is shown therein a lead shield 42 which may be disposed about the counter tube in a manner such as to block substantially all radiation. In such an arrangement, the electrostatic generator 4 will increase the charge on the central electrode 41 of the ionization chamber 40 until the potential across the chamber 40 reaches a certain threshold. When this voltage threshold is attained, the counter tube 40 will "fire" and a discrete flow of current will pass to the anode 24 as hereinbefore described. The current flow through the tube 40 wil be relatively short-lived, however, because as the tube voltage drops due to the flow of current through the tube, the discharge is quenched or extinguished in the well known manner and will not again "fire" until the tube has recovered and the threshold voltage is again attained. Thus, by choosing a tube or ionization chamber 40 with the proper threshold characteristics, and by controlling the operation of the electrostatic generator 4, the pulsation rate of the neutron source can be effectively controlled within reasonable limits.

In another modification of the present invention, a so-called "trigger" 44 composed of a minute quantity of radioactive material may be disposed within a recess 45 in the rim of the upper pulley 36, and the shield 42 may be formed to expose the counter tube 40 in the direction of the upper pulley 36. In such an arrangement, the upper pulley 36 is preferably fashioned of an opaque material so the recess will function to collimate the radiation emitted by the trigger 44. Thus, the trigger 44 will sweep a beam of radiation across the counter tube 40 with each revolution of the upper pulley 36, and the rotation rate of the upper pulley 36, and thus the pulsation rate of the neutron source, may be selected by adjusting the speed of the motor 5 as desired.

In another alternative of the present invention depicted in FIGURE 2, the conventional Geiger-Muller counter tube 40 may be replaced by either a light-sensitive or an ultra-violet ray sensitive Geiger-Muller counter or photodiode. In such a case, the function of the trigger 44 may be performed by a device providing a pulsed light or ultraviolet ray beam at ground potential and may be located at any convenient point outside the high voltage terminal rather than within the upper pulley 36 as hereinbefore described. With this embodiment of the invention, the tube may be of the type which is triggered at the beginning of the incident pulse of visible or ultraviolet light; or it may be of the type which conducts uniformly while the light beam strikes it, and ceases to conduct when the beam is directed elsewhere.

Figure 3:
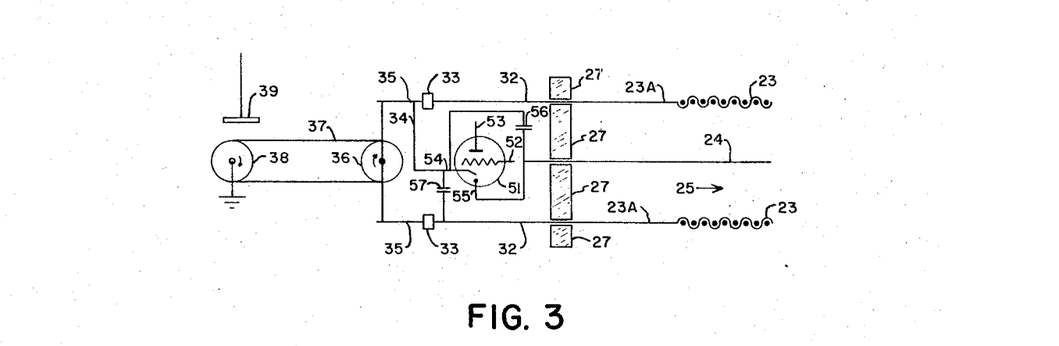
FIGURE 3 is a similar representation of an accelerator tube and electrostatic genertaor, including a trigger tube interconnected for triggering the accelerator tube.

Referring now to FIGURE 3, there may be seen another abbreviated representation of the neutron source depicted in FIGURE 1, wherein a commercial gas-filled trigger tube 51 is connected to supply the threshold function. Specifically, the anode and control grid of the trigger tube 51 are left "floating," and the cathode 55 and "keep alive" electrode 54 are, respectively, connected to the anode 24 of the accelerator tube 2 and the upper hollow electrode 35. When arranged in this manner, a typical trigger tube 51, such as the CBS 7230 or the EII 28, will fire at a reproducible threshold potential of about 200 to 300 volts, and will extinguish itself whenever the current developed by the electrostatic generator 4 is less than a critical value within a range of approximately 40 to 100 microamperes. When connected as shown, with a 50 micro-microfarad shunt capacitor 56 between the cathode 55 and the keep-alive electrode 54, and with a 100 micro-microfarad capacitor 57 between the keep-alive electrode 54 and the upper hollow electrode 32, this arrangement has been found to produce ionization current pulses across the ionization gap 25 at a rate of 500 to 5000 pulses per second, and of a duration of the order of 100 microseconds or less per pulse, depending upon the particular component values selected for the circuit. The values herein given for capacitors 56 and 57 may be varied as desired.

Figure 4:
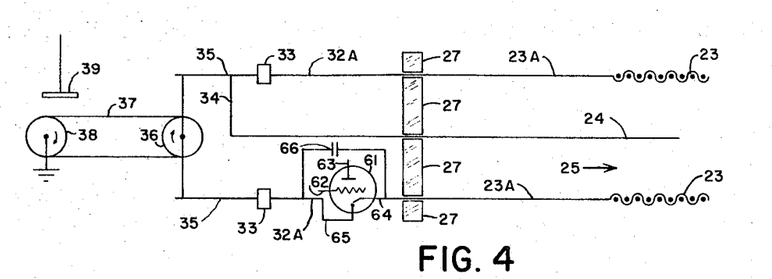
FIGURE 4 is a schematic representation of a modified form of the apparatus depicted in FIGURE 3.

FIGURE 4 shows a variation of the neutron source depicted in FIGURES 1–3, wherein the upper hollow electrode 32A is similar to the previously depicted upper hollow electrode 32, but is not electrically connected to the cathode 23 of the accelerator 2 as hereinbefore described. Instead, a trigger tube 61 is arranged with its keep-alive electrode 64 electrically connected to the cathode 23 of the accelerator tube 2, and with the cathode 65 of the trigger tube 61 connected electrically to the modified upper hollow electrode 32A. A shunt capacitor 66, of suitable value, is also connected across the trigger tube 61, and the control grid 62 and anode 63 of the trigger tube 61 are also left "floating" as depicted in FIGURE 3.

The various forms of the present invention, which are embodied in the circuits depicted in FIGURES 2–4, will all function adequately for many purposes. However, unless the various components forming the depicted circuits are selected for specific characteristics, the neutron output of the accelerator tube 2 may extinguish relatively slowly after each output pulse. Furthermore, the accelerator tube 2 may begin to produce neutrons, in limited quantities, prior to each firing of whatever "triggering" device is utilized (Geiger-Muller tube 40, trigger tube 51, or trigger tube 61). In such a case, the neutron pulses emitted by the accelerator tube 2 may not be as "sharp" as may be desired. Nevertheless, a neutron source incorporating any of these circuits will operate to produce clearly defined neutron pulses at a very high frequency.

Figure 5:
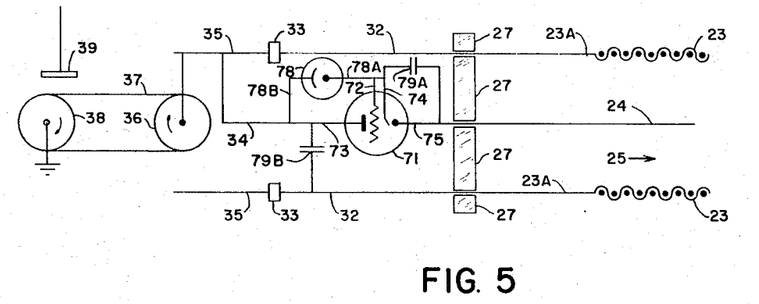
FIGURE 5 is a schematic representation of another modified form of the apparatus depicted in FIGURE 3.

FIGURE 5 shows another embodiment of the present invention wherein a trigger tube 71, of the type herein depicted in FIGURES 3–4, is arranged with its cathode 75 connected to the anode 24 of the accelerator tube 2, and with its plate or anode 73 connected via conductor 34 to the lower hollow electrode 35 and the upper pulley 36 of the electrostatic generator 4. Both the keep-alive electrode 74 and the control grid 72, of the trigger tube 71, are connected to the cathode 78A of a corona regulator tube 78, which has its plate 78B connected to the anode 73 of the trigger tube 71. The cathode 78A, of the corona regulator tube 78, is also connected to one side of a shunt capacitor 79A, the other side of which is connected to the cathode 75 of the trigger tube 71. In this arrangement, the corona regulator tube 78 is chosen so that its threshold voltage is lower than the threshold voltage of the trigger tube 71. As the electrostatic generator 4 operates to deliver an increasing charge to the anode 73 of the trigger tube 71, the potential increases across the corona regulator tube 78 at a rate determined by the size of the interelectrode capacitance between the upper hollow electrode 32 and the cathode 23 of the accelerator tube 2. Thus, a capacitor 79B is preferably provided herein to establish this rate at the value desired, since the rate will determine the pulse frequency of the neutron source.

When the threshold voltage across the corona regulator tube 78 is attained, the corona regulator tube 78 will develop a current flow from the anode 73 of the trigger tube 71 to its control grid 72 and its keep-alive electrode 74. It is an inherent characteristic of any corona regulator tube, however, that its "conducting" potential is substantially lower than its threshold potential, and thus the resulting voltage drop across the corona regulator tube 78 will correspondingly produce a sudden increase in the potential across the shunt capacitor 79A. This increase in potential is also produced between the cathode 75 and keep-alive electrode 74, of the trigger tube 71, to effectively "trigger" a short burst, or pulse, of current flow between the anode 73 and the cathode 75 of the trigger tube 71. However, any current flow between the anode 73 and the control grid 72, of the trigger tube 71, effectively "shorts out" the corona regulator tube 78 and extinguishes it by reducing the potential between its cathode 78A and plate 78B to a level substantially below its conducting potential. This effectively "quenches" the trigger tube 71, and cuts off current flow between its anode 73 and control grid 72, and therefore interrupts current flow to the anode 24 of the accelerator tube 2. As hereinbefore explained for capacitor 57 in FIGURE 3, capacitor 79B acts to determine (according to its characteristics) the frequency at which the overall circuit depicted in FIGURE 5 will deliver pulses of current to the anode 24 of the accelerator tube 2.

Referring now to FIGURE 5, there may be seen a preferred embodiment of the present invention wherein a neutron source composed of an accelerator tube 2 and an electrostatic generator 4 is represented substantially as depicted in FIGURE 1. As hereinbefore described, the induction plate supply 6 induces a positive charge on the belt 37 as it passes the induction plate 39, and this positive charge is carried to the anode 24 of the accelerator tube 2 by means of the upper pulley 36, the lower hollow electrode 35, and the conductor 34. After a sufficient amount of charge has been delivered in this manner to produce the triggering action hereinbefore described, the accumulated charge is delivered to the anode 24, of the accelerator tube 2. The difference in potential across the ionization gap 25 then is caused to exceed a threshold magnitude, whereupon electrons will flow from the cathode 23, of the accelerator tube 2, to its anode 24 by means of cold cathode emission. It is apparent that due to the flow of current to the anode 24 thereby charging the interelectrode capacitances, a potential difference will not only be developed across the ionization gap 25, but also between other electrodes in the system such as the acceleration gap 26, between the suppressor rings 12 and the target 22, and between the cathode 23 and the suppressor rings 12. When current flows across the ionization gap 25, the difference in potential between the cathode 23 and the anode 24 is reduced in proportion to the amount of charge transferred. Thus, when the trigger means ceases to conduct, the potential difference between cathode 23 and anode 24 drops immediately to the threshold where conduction ceases. Thus, ionization in the acceleration tube ceases and neutron productions stops until the cycle is repeated after charge has again accumulated to once more fire the trigger means. However, this potential difference is by no means eliminated.

Figure 6:
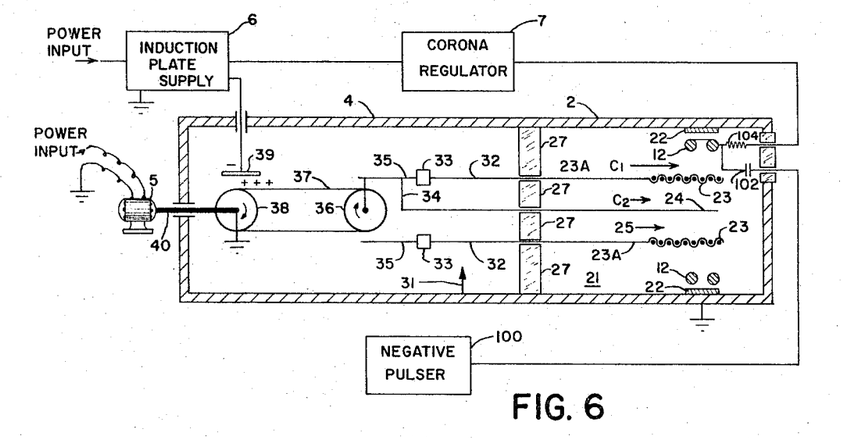
FIGURE 6 is a schematic representation of the apparatus depicted in FIGURE 1, including triggering apparatus interconnected with the suppressor ring system in the accelerator tube.

In another embodiment of the present invention as depicted in FIGURE 6, there may be seen a pulse generator 100 which is connected to a coupling condenser 102, which is preferably large in capacitance relative to the interelectrode capacitance, said interelectrode capacitance being hereinafter referred to as $C_1$. Capacitance $C_1$ exists between the suppressor rings 12 and the cathode 23. The coupling condenser 102 is, in turn, coupled between the load resistor 104 usually connected in the suppressor ring circuit and the suppressor rings 12. The pulse generator 100 may be adapted to apply a sequence of negative pulses to the coupling condenser 102, at either a fixed preselected frequency, or at a rate determined by surface located control apparatus not shown in the drawings.

These negative pulses on the suppressor rings 12 produce negative pulses on the cathode 23 due to the capacitance coupling provided by interelectrode capacitance $C_1$. Since positive current is delivered to the anode 24 by the electrostatic generator 4, the cathode 23 is always negatively charged to some extent with respect to the charge on the anode 24, except of course when the entire system is inactivated. However, each time the pulse generator 100 applies a pulse as hereinbefore described, the cathode 23 will become negatively charged relative to its normal condition so that its potential relative to the anode 24 exceeds the normal threshold voltage of the ionization gap 25. This produces an almost instantaneous spurt, or "pulse," of electrons and in current between the cathode 23 and the anode 24; which in turn provides a corresponding pulse of deuterium ions towards the target 22. If the applied pulse is large enough, all of the ion current which would normally flow between cathode 23 and anode 24 during the interval delineated by two such pulses produced and applied to the system by the pulse generator 100, flows instead during the interval of each of these negative pulses. The magnitude of the required pulse obviously depends upon the Van de Graaff current, the desired repetition rate, and pulse duration. It has been found that an applied pulse of 3000 volts will produce an ion current pulse which will in 20 microseconds substantially discharge the interelectrode capacitance $C_2$ subsisting between anode 24 and cathode 23. After a pulse of this type has occurred, no ionization current will appear across the ionization gap 25 until another negative pulse is supplied by the pulse generator 100, or until the electrostatic generator 4 succeeds in "recharging" $C_2$ up to its threshold potential. With a generator charging current of 30 microamperes or less it has been found that this does not occur for about 1000 microseconds. This second alternative can be eliminated by causing the pulse generator 100 to deliver its negative pulses at such a frequency, or at such an amplitude (or both), that $C_2$ is never recharged to its threshold potential within the time interval subsisting between pulses. Thus, neutrons will be produced, by this embodiment of the present invention, only in the form of sharply defined pulses, and only in response to pulses applied by the pulse generator 100 to the coupling condenser 102. The interelectrode capacitance (hereinafter referred to as $C_3$) between the lower hollow electrode 35 and the tank 30 of the electrostatic generator 4, tends to hold the potential of the anode 24 constant during the occurrence of the pulse supplied by the pulse generator 100. This is an important feature of the embodiment of the present invention depicted in FIGURE 6, since the Van de Graaff electrostatic generator 4 is a constant-current power supply, and since the neutron source depicted includes provision (such as the corona point 31 hereinbefore discussed) for stabilizing certain voltages such as the voltage across the accelerating gap 26.

Figure 7:
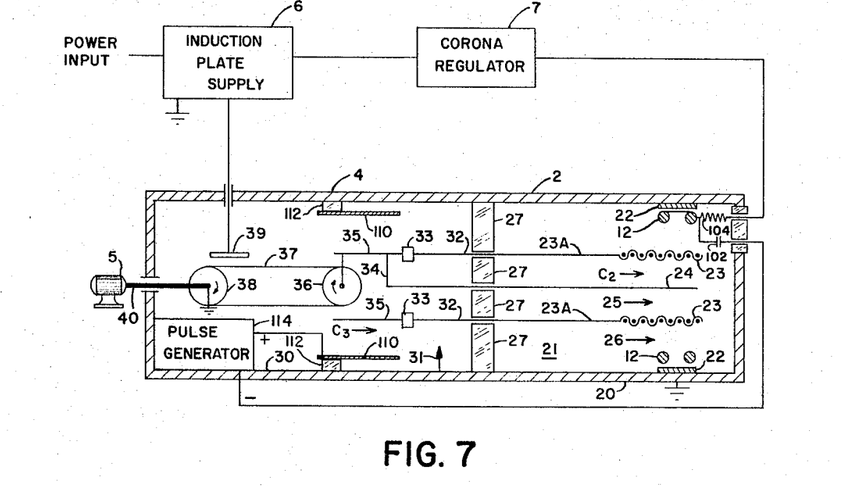
FIGURE 7 is a schematic representation of a modified form of the apparatus depicted in FIGURE 6.

It will be apparent to those skilled in the art that the various interelectrode capacitances in the neutron source, by operation of the electrostatic generator 4, are all relative to each other in magnitude, and may vary in magnitude according to variations in any one or more of such capacitances. Thus, alternative forms of the present invention depicted in FIGURE 6 may be provided by applying "triggering" pulses to one or more of these interelectrode capacitances, other than $C_1$ as hereinbefore described. For example, FIGURE 7 shows a variation of the circuitry and system depicted in FIGURE 6, wherein an auxiliary electrode 110 is mounted within the electrostatic generator 4, opposite the lower hollow electrode 35, and near the tank 30 of the electrostatic generator 4. This auxiliary electrode 110 is preferably insulated from the tank 30 (which is at "ground" potential) by an insulator 12, and is connected to a pulse generator 114 which, in turn, is adapted to generate positive pulses analogous to the manner previously described for the pulse generator 100 shown in FIGURE 6. In FIGURE 7, the positive pulse generator 114 is shown located within the electrostatic generator 4, but this is not a significant feature of the present invention.

During operation of the electrostatic generator 4, the current build-up on the anode 24, of the accelerator tube 2, will develop charges on the various interelectrode capacitances throughout the system as hereinbefore explained. If the pulse generator 114 is then caused to apply a sharp positive pulse of suitable magnitude to the auxiliary electrode 110, as depicted in FIGURE 7, no change will occur instantaneously in the charge on $C_3$. Since the charge on any capacitor is always the product of the capacitance of such capacitor and the voltage across it, and since the capacitance of $C_3$ is constant, it follows that the voltage across $C_3$ tends to remain constant during the applied pulse. Since the voltage across $C_3$ is unchanged, then the anode 24 will be driven further "positive," with respect to the cathode 23 (and the target 22 and suppressor rings 12, etc.) to the extent of the positive pulse supplied by the pulse generator 114. Given proper operating conditions (such as the proper rate of accumulation of charge on the anode 24), the potential difference across $C_2$ will be caused to responsively rise above the threshold for ionization current flow across the ionization gap 25, and produce a burst of ions as hereinbefore described. Furthermore, given a suitable pulse frequency, all of the current which would, in the absence of pulses, be caused to flow across the ionization gap 25, during the interval between two pulses from the pulse generator 114, will be caused to flow during the triggering pulse. Since $C_2$ is, in effect, completely "discharged" by the triggering pulse provided by the pulse generator 114, no ionization current flows until the next pulse occurs, with the result that all neutrons are produced in bursts of pulses synchronous with the voltage pulses applied to electrode 110.

Referring again to FIGURE 7, it may be seen that the pulse generator 114 may be adapted to supply also a negative trigger pulse to the coupling condenser 102, of the suppressor ring 12 circuit, in the manner shown in FIGURE 6. This negative pulse should, of course, be applied simultaneously with the application of the positive pulse to the auxiliary electrode 110. However, the negative pulse need not necessarily be supplied by the pulse generator 114, but may be developed by a separate pulse source.

Figure 8:
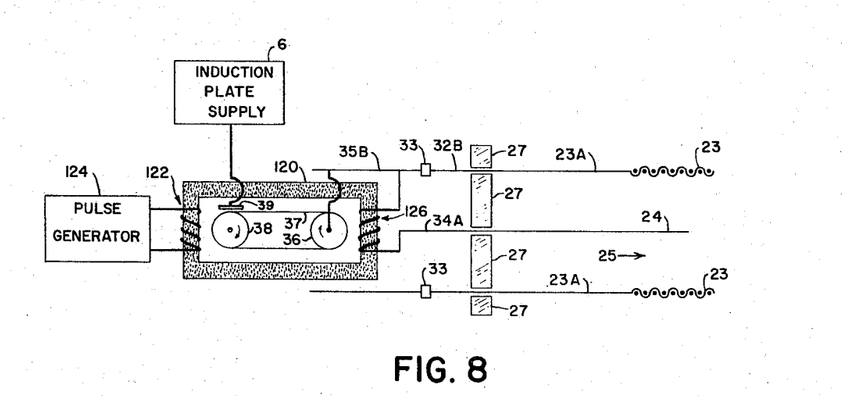
FIGURE 8 is a schematic representation of another modified form of the apparatus depicted in FIGURE 3.

FIGURE 8 shows another alternative form of the present invention, wherein a positive trigger pulse is coupled to the anode 24 by means of transformer coupling. This transformer coupling may be effected by means of a core 120 which is preferably formed of a substance which may be magnetized but which is substantially nonconductive, though under favorable circumstances, adequate coupling may be effected without a magnetic core. The core 120, which may form the support column for the upper and lower pulleys 36 and 38, also supports a "primary" winding 122 which is connected to receive trigger pulses from any suitable pulse generator 124, and a "secondary" winding 126 which is interconnected between the lower hollow electrode 35B and the conductor 34A connected to deliver current to the anode 24 of the accelerator tube 2. The pulses applied to the primary winding 122 may be of either polarity, provided that the primary and secondary windings 122 and 126 are wound, relative to each other, so that the secondary winding 126 delivers pulses of positive polarity. The lower hollow electrode 35B depicted in FIGURE 8 functions in a manner similar in all essential aspects to the lower hollow electrode 35 depicted in FIGURE 1. However, it may be modified in form to accommodate the core 120. Similarly, the upper hollow electrode 32B may be modified in form to accommodate the core 120. The apparatus depicted generally in FIGURE 8 functions in a manner similar to the apparatus depicted in FIGURE 5. That is, the positive pulses delivered by the secondary winding 126 act to raise the potential difference between the anode 24 and the cathode 23 during the pulse and thereby trigger the flow of current which "discharges" the interelectrode capacitances where charge has accumulated due to the operation of the electrostatic generator 4 in the same manner that the positive pulses applied to the auxiliary electrode shown in FIGURE 7 operated as hereinbefore described.

In particular, the present invention is not limited in its application to sources employing a Van de Graaff or other electrostatic generator as a source of ion accelerating voltage. The principles of the present invention may equally well be applied to operate a given acceleration tube with any conventional high voltage generator, provided that a generator is selected which has a high output impedance. It is important that excessive currents are not caused to flow when the neutron source is triggered. To avoid this, it is not only necessary that a high resistance be connected in series with the output of the high voltage generator in order that its operation be analogous, in every respect, to the operation of the Van de Graaff generator as herein described.

Moreover, the present invention may be applied to the pulsed operation of acceleration tubes differing in design from the preferred embodiment herein disclosed. As will be understood by those skilled in the art, the present invention may be employed in exactly the same way with any neutron source which is operated in such a way that a single voltage supply provides both the ion producing and ion accelerating function after the manner disclosed in the copending application for Letters Patent filed by A. H. Youmans and Eric C. Hopkinson, on Aug. 26, 1959, and bearing Ser. No. 836,098, and which issued as U.S. Patent No. 3,117,314.

Numerous other variations and modifications may obviously be made without departing from the present invention. Accordingly, it should be clearly understood that those forms of the invention described above and shown in the figures of the accompanying drawings are illustrative only, and are not intended to limit the scope of the invention.

What is claimed is:
1. A source of neutrons comprising
an ion beam accelerator and a constant current generator;
said accelerator including
    a static atmosphere substantially composed of a heavy isotope of hydrogen,
    ionization means connected to said generator to ionize said atmosphere,
    and a target containing a heavy isotope of hydrogen arranged to receive atmosphere ions;
said source further including pulsing means interconnected with said ionization means and said generator to intermittently energize said ionization means in a manner such that ionization means ionizes said atmosphere in a functionally related intermittent manner.

2. A source of neutrons comprising
an ion beam accelerator and a constant current electrostatic generator;
said accelerator including
    a static atmosphere substantially composed of a heavy hydrogen isotope,
    means including an anode and a cathode arranged to produce an ionizing flow of electrons in said atmosphere,
    and a target containing a heavy hydrogen isotope arranged to receive hydrogen isotope ions produced in said atmosphere by said electron flow;
said generator including
    and endless rotatable belt,
    means for developing an electric charge on said belt at a first location,
    and a collector electrode for receiving such electric charge from said belt at a second location;
said neutron source also comprising
    pulsing means interconnected with said anode and said collector electrode to intermittently conduct said electric charge therebetween to produce said ionizing flow of electrons in a functionally related intermittent manner.

3. The apparatus in claim 2 wherein said pulsing means includes a charge conducting means having a predetermined threshold.

4. The apparatus in claim 2 wherein said pulsing means includes
conducting means having a predetermined threshold, and
quenching means arranged and adapted to respond to conduction of said electric charge by said conducting means in a manner to interrupt such conduction after a predetermined time interval.

5. The apparatus in claim 3 wherein said charge conducting means includes a Geiger-Muller counter having a central electrode connected to said collector electrode in said generator and having a jacket electrode connected to said anode in said accelerator.

6. The apparatus in claim 4 wherein said Geiger-Muller counter is shielded from incident radiation.

7. The apparatus in claim 3 wherein said pulsing means includes
a first capacitance connected between said collector electrode and said accelerator cathode, and
a second capacitance connected across said charge conducting means between said collector electrode and said accelerator anode.

8. The apparatus in claim 7 wherein said first capacitance is greater than said second capacitance.

9. The apparatus in claim 5 wherein said Geiger-Muller counter is disposed in a radiation shield having an aperture adjacent said endless belt at said second location, and including actuating means operated by said belt and adapted to periodically cause said Geiger-Muller counter to conduct said electric charge.

10. A source of neutrons comprising an ion beam accelerator and a constant current electrostatic generator;
said accelerator including
    a static atmosphere composed of a heavy hydrogen isotope,
    means including an anode and a cathode arranged to provide an ionizing flow of electrons in said atmosphere,
    a target containing a heavy hydrogen isotope arranged to receive hydrogen isotope ions produced in said atmosphere by said electron flow, and an intermediate electrode capacitively arranged relative to said cathode;

said generator including
an endless rotatable belt,
means for developing an electric charge on said belt at a first location,
a collector electrode arranged and adapted to receive such electric charge from said belt at a second location;

and pulsing means interconnected with said collector electrode in said accelerator for sequentially allowing and interrupting said ionizing flow of electrons.

11. The apparatus in claim 10 wherein said pulsing means includes an electric pulse generator arranged and adapted to sequentially apply to said collector electrode electric pulses of an amplitude and polarity such as to cause said electron flow to occur substantially only during each of said pulses.

12. A source of neutrons comprising an ion beam accelerator and a constant current electrostatic generator;
said accelerator including
a static atmosphere composed of a heavy hydrogen isotope,
means including an anode and a cathode arranged to provide an ionizing flow of electrons in said atmosphere,
and a target containing a heavy hydrogen isotope arranged to receive hydrogen isotope ions produced in said atmosphere by said electron flow;
said generator including
an endless rotatable belt,
means for developing an electric charge on said belt at a first location,
a first electrode arranged and adapted to receive such electric charge from said belt at a second location,
and a second electrode capacitively arranged in said generator relative to said first electrode;
and pulsing means interconnected with said second electrode in said generator for sequentially allowing and interrupting said ionizing flow of electrons.

13. The apparatus in claim 12 wherein said pulsing means includes an electric pulse generator arranged and adapted to sequentially apply to said second electrode electric pulses of an amplitude and polarity such as to cause said electron flow to occur substantially only during each of said pulses 14. The apparatus in claim 13 wherein said accelerator also comprises an electrode arranged intermediately of said target and said means including an anode and a cathode, and wherein said electric pulse generator is also interconnected with said electrode in said accelerator.

15. The apparatus in claim 14 wherein said electric pulse generator is further adapted to apply pulses of a first polarity to said second electrode in said generator and coincidently therewith to apply pulses of a second polarity to said intermediately arranged electrode in said accelerator.

16. A source of neutrons comprising an ion beam accelerator and a constant current electrostatic generator;
said accelerator including
a static atmosphere composed of a heavy hydrogen isotope,
means including an anode and a cathode arranged to provide an ionizing flow of electrons in said atmosphere,
and a target containing a heavy hydrogen isotope arranged to receive hydrogen isotope ions produced in said atmosphere by said electron flow;
said generator including
an endless belt,
means for rotating said belt,
means for developing an electric charge on said belt at a first location,
and an electrode for receiving such charge from said belt at a second location;
said neutron source also comprising
pulsing means including
a coupling transformer having one of two windings interconnected between said electrode in said generator and said anode in said accelerator,
and an electric pulse generator connected to the other of said two windings of said transformer.

17. A source of neutrons comprising an ion beam accelerator and a constant current electrostatic generator;
said accelerator including a static atmosphere composed substantially of a heavy isotope of hydrogen,
ionization means arranged to provide an ionizing flow of electrons in said atmosphere,
and a target containing a heavy isotope of hydrogen arranged to receive atmosphere ions;
said source further including pulsing means comprising
an electrode capacitively arranged relative to said ionization means, and
an electric pulse generator connected to sequentially apply electric voltage pulses to said electrode to cause said flow of electrons to occur substantially only during each of such pulses.

18. The apparatus in claim 17 wherein said ionization means includes an anode and a cathode, and wherein said electrode is capacitively arranged relative to said anode.

19. The apparatus in claim 17 wherein said ionization means includes an anode and a cathode, and wherein said electrode is capacitively arranged relative to said cathode.

20. Apparatus for producing pulses of radiation comprising
a power supply continuously operating to produce charge flow at not more than a preselected rate;
storage means receiving a charge from said power supply; and
an ion accelerator including
a static atmosphere of hydrogen,
ionization means having a voltage threshold and including an anode and a cathode, said anode being interconnected with said storage means, and
a target arranged to receive hydrogen ions;
said apparatus further comprising pulsing means for intermittently increasing the voltage of said anode relative to said cathode above said threshold to transfer between said anode and said cathode a discrete amount of charge equal to the charge flow delivered by said power supply during the interval since the preceding pulse.

21. Apparatus as described in claim 20, wherein said storage means includes a first capacitance connected to the output of said power supply,
and wherein said pulsing means includes a second capacitance and a source of pulsated voltage, said second capacitance being connected to said first capacitance and to said source of pulsated voltage, said second capacitance also being connected in series with said power supply and said first capacitance.

22. Apparatus as described in claim 21, wherein said source of pulsated voltage produces voltage pulses at a predetermined rate.

23. Apparatus for cyclically producing pulses of radiation with a predetermined period, said apparatus comprising
a power supply continuously operating to produce charge flow at not greater than a preselected maximum rate;
storage means receiving charge from said power supply; and an ion accelerator including
    a static atmosphere of hydrogen,
    ionization means having a voltage threshold and including an anode and a cathode, said anode being interconnected with said storage means, and
    a target arranged to receive hydrogen ions;
said apparatus further comprising pulsing means for cyclically increasing the voltage of said anode relative to said cathode above said threshold to transfer between said anode and cathode a discrete amount of charge equal to the charge delivered by said power supply during said predetermined cycle period.

24. A source of neutrons comprising
a power supply continuously generating a flow of charge;
an ion accelerator including
    a static atmosphere substantially composed of a heavy isotope of hydrogen,
    ionization means connected to said power supply to ionize said atmosphere,
    and a target containing a heavy isotope of hydrogen arranged to receive atmosphere ions;
and pulsing means interconnected with said power supply and said ionization means to cause said ionization means to produce functionally related discrete pulses of atmosphere ions.

25. A source of radiation comprising
a power supply continuously operating to produce charge flow at not more than a preselected maximum rate;
storage means interconnected to receive at least a preselected amount of charge flow from said power supply;
an ion accelerator including
    a static atmosphere of hydrogen,
    ionization means having a voltage threshold and including an anode and a cathode, said anode being interconnected with said storage means and said power supply, and
    a target arranged to receive hydrogen ions;
said source of radiation further comprising pulsing means for intermittently increasing the voltage of said anode relative to said cathode above said threshold to transfer between said anode and said storage means a discrete amount of charge flow equal to said preselected amount of charge in said storage means.

26. A source of radiation comprising
a power supply continuously operating to produce charge flow at not more than a preselected maximum rate;
storage means interconnected to receive at least a preselected amount of charge flow from said power supply during a first predetermined time interval;
an ion accelerator including
    a static atmosphere of hydrogen,
    ionization means having a voltage threshold and including an anode and a cathode, said anode being interconnected with said storage means and said power supply, and
    a target arranged to receive hydrogen ions;
said source of radiation further comprising pulsing means for increasing the voltage of said anode relative to said cathode above said threshold during a second shorter predetermined time interval to transfer between said anode and said storage means during said second interval a discrete amount of charge flow equal to said preselected amount of charge in said storage means.

References Cited by the Examiner

UNITED STATES PATENTS

| 2,960,610 | 11/1960 | Gale | 250—84.5 |
| 2,967,258 | 1/1961 | Gale | 322—2 |
| 3,141,975 | 7/1964 | Carr | 250—84.5 |

ARCHIE R. BORCHELT, *Primary Examiner.*

JAMES W. LAWRENCE, RALPH G. NILSON,
*Examiners.*